United States Patent [19]

Lindbom

[11] Patent Number: 4,688,983

[45] Date of Patent: Aug. 25, 1987

[54] LOW COST ROBOT

[75] Inventor: Torsten H. Lindbom, Ft. Collins, Colo.

[73] Assignee: Unimation Inc., Danbury, Conn.

[21] Appl. No.: 612,352

[22] Filed: May 21, 1984

[51] Int. Cl.$^4$ .............................. B25J 9/14
[52] U.S. Cl. .................................. 414/735; 901/15; 901/21; 901/22; 901/26; 901/29
[58] Field of Search ............... 901/15, 21, 22, 26, 901/29; 414/7, 735

[56] References Cited

U.S. PATENT DOCUMENTS

| | | | |
|---|---|---|---|
| 3,572,807 | 3/1971 | Haaker et al. | 901/29 X |
| 3,661,051 | 5/1972 | Dunne et al. | 901/29 X |
| 4,260,940 | 4/1981 | Engelberger et al. | 901/15 X |
| 4,608,884 | 9/1986 | Beyer | 74/665 B |

Primary Examiner—Robert J. Spar
Assistant Examiner—P. McCoy Smith
Attorney, Agent, or Firm—M. P. Lynch

[57] ABSTRACT

An industrial robot in which both a column which is pivotally mounted on a rotatable base member and a boom which is pivotally mounted on the upper end of the column are of hollow construction to provide a rigid lightweight structure capable of carrying substantial loads. The column is counterbalanced by a spring and the boom is counterbalanced by pneumatic cylinders on a movable carriage so that the major axes of the robot can be driven by relatively low energy driving sources. A simplified hand gear train is provided which is capable of carrying substantial loads and is easily serviced.

2 Claims, 17 Drawing Figures

LOW COST ROBOT

The present invention relates to programmable industrial robots, and, more particularly, to industrial robots which have the weight handling capability, reach and accuracy required to perform heavy duty industrial operations such as spot welding and parts transfer operations.

It is a primary object of the present invention to provide an industrial robot of this type which is of simplified construction, may be manufactured at low cost, and may be easily serviced and maintained.

In heavy duty industrial robot applications there is a need to move relatively large loads over a relatively large work volume and to position such large loads accurately at any point in the work volume. While industrial robots have been constructed in various ways in the past to satisfy such needs, in general these industrial robots have employed a construction in which the main vertical member and the main horizontal member are in the form of massive columns or beams which rely on rugged construction to provide the necessary accuracy. While such beam type construction is rigid enough to provide the desired accuracy, the massive design of such construction requires a relatively large amount of energy to drive the arm over the desired path. Also, the maximum acceleration which may be achieved by such massive type arm constructions is very low with a drive system of reasonable size and cost.

In an effort to satisfy the above described needs in heavy duty industrial applications, many industrial robots have employed complicated linkages and drive mechanisms to accomplish the desired accurate movement of the end of the arm throughout the working volume. In many instances these linkages and drive mechanisms project outwardly from the main column and beam of the robot so that they are exposed and constitute a danger to personnel as the arm swings back and forth and up and down over a desired path.

In other instances counterbalancing of the vertical column or horizontal beam has been accomplished by counterweights or pneumatic balancing arrangements which also project at various angles from the industrial robot and constitute a danger to personnel during movement of the arm of the robot.

In most industrial robot applications, it is desirable to increase the speed at which the robot can perform a given job so that the work output of the robot per unit of time is increased. Since most industrial robot operations involve numerous decelerations of the robot arm, in order to increase the speed at which the robot performs a given job it is important to minimize the time required for the arm to be accurately stopped at a desired location. However, conventional manipulator arm structures are so compliant, both in the various links which make up the arm and in the joints which interconnect the links, that they must be decelerated quite slowly in order that the control system can accurately position the end of the arm at the desired location. The maximum permissible deceleration is also reduced because many control systems involve feedback measurement at the joint rather than at the end of the arm so that compliance in the manipulator links and joints limits the rate at which the end of the arm may be moved to a desired location without overshoot and oscillation about that location before the arm comes to rest. Since most work operations can only be performed after the arm has been accurately positioned at a desired location and comes to rest, the speed at which work operations can be performed with such high compliance manipulator arm structures is severely limited.

It is, accordingly, a further object of the present invention to provide a new and improved industrial robot construction which avoids one or more of the above-described difficulties of prior art arrangements.

It is another object of the present invention to provide a new and improved industrial robot construction wherein all of the linkages and drive means for moving the end of the arm through a work volume are enclosed within the main column and boom of the robot so as to minimize danger to personnel during operation of the industrial robot.

It is a further object of the present invention to provide a new and improved industrial robot wherein the column and boom of the robot are of hollow, lightweight construction and yet have extreme stiffness so that the linkages and drive means for moving the arm may be contained within the hollow column and boom and move the end of the arm at high speed and great accuracy to any point within a given work volume.

It is another object of the present invention to provide a new and improved industrial robot construction wherein the main column of the robot is counterbalanced by a simple compression spring arrangement so that the column may be pivoted about a horizontal axis by relatively low energy driving means.

It is a further object of the present invention to provide a new and improved industrial robot construction wherein a pneumatic counterbalancing arrangement is provided for the boom of the robot so that this boom may be tilted about a horizontal axis by a relatively low energy driving means.

It is a further object of the present invention to provide a new and improved industrial robot which is provided with pneumatic boom counterbalancing and wherein the mechanism for accomplishing such counterbalancing is entirely enclosed within the hollow turret or column of the industrial robot on the upper end of which the boom is pivotally mounted.

It is a further object of the present invention to provide a new and improved industrial robot of simplified low cost construction which may be adapted for either hydraulic or electric drive in each of the axes of the industrial robot.

It is another object of the present invention to provide a new and improved industrial robot wherein the vertical column of the robot comprises upper and lower members which are interconnected by means of a thin-walled sleeve of lightweight material to provide an extremely rigid construction for the vertical column while at the same time providing an enclosure for containing the drive mechanism which moves the column and boom of the industrial robot.

It is a further object of the present invention to provide a new and improved industrial robot structure wherein both the major links and the joints interconnecting such links are relatively stiff and have relatively low compliance so that the arm may be accurately decelerated to desired location in a relatively short period of time while the arm is carrying a relatively large load.

The invention both as to its organization and method of operation, together with further objects and advantages thereof, will best be understood by reference to the following specification taken in connection with the accompanying drawings, in which.

Figures 12, 13, 14:
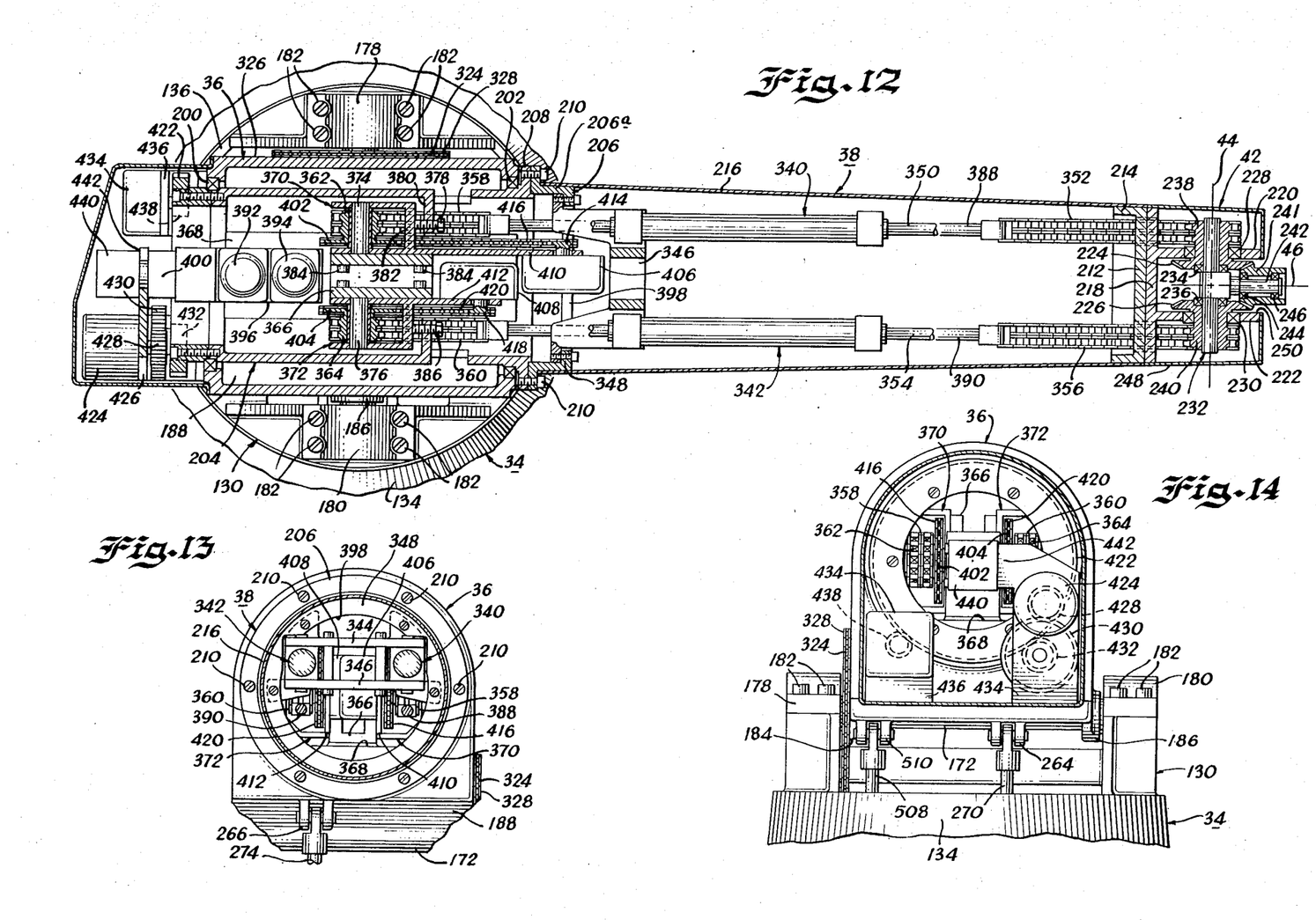
FIG. 12 is a sectional view taken along the line 12—12 of FIG. 7.
FIG. 13 is a sectional view taken along the line 13—13 of FIG. F.
FIG. 14 is a sectional view taken along the line 14—14 of FIG. 7.
Figure 17:
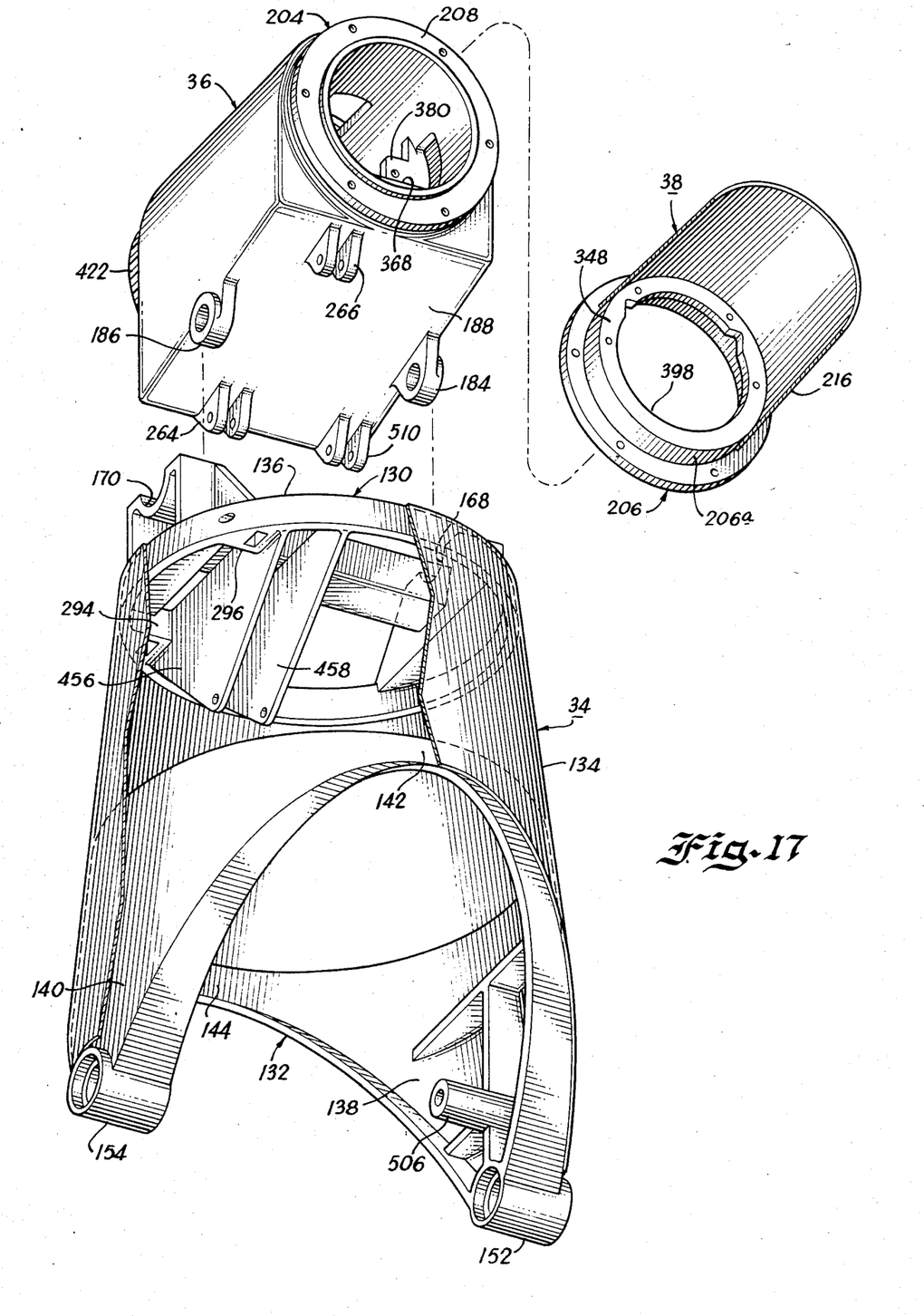
FIG. 17 is an exploded perspective view of the upper and lower boom structures of the robot of FIG. 1 showing the monocoque construction thereof.

Referring now to the drawings, the industrial robot of the present invention is therein illustrated as comprising a fixed base support member indicated generally at 30 on which is mounted a large diameter base member indicated generally at 32, the base member 32 being rotatably mounted on the base support 30 for rotation about a central vertical axis. A large diameter turret or pillar 34 is pivotally mounted on the base member 32 near diametrically opposed edges thereof and supports on its upper end a boom housing indicated generally at 36 and an outer boom indicated generally at 38. The boom housing 36 is pivotally mounted on the upper end of the turret 34 for rotation about a horizontally extending bearing rod 40 mounted in the upper end of the turret 34. One end of the outer boom 38 is rotatably mounted in the boom housing 36 so that the boom 38 is rotatable about its longitudinal axis. A manipulator hand member, indicated generally at 42, is rotatably mounted in the outer end of the boom 38 so that the manipulator hand member 42 may be rotated about an axis 44 (FIG. 12) which is perpendicular to the longitudinal axis of the boom 38 and may also be rotated about an axis 46 which intersects with and is perpendicular to the axis 44. The manipulator hand 42 is arranged to carry any suitable gripper mechanism for seizing and releasing an article which is to be manipulated by the robot. In the alternative, the manipulator hand 42 may support a suitable work device such as a spot welding gun, a paint spray head or an arc welding mechanism, as will be readily understood by those skilled in the art.

Considering first the manner in which the rotatable base member 32 is rotatably mounted on the base support 30, the base support 30 is provided with an upstanding annular ring portion 50 (FIG. 6) on the upper surface of which a flat roller bearing raceway 52 is mounted. A series of 12 roller bearings 54 whicn are rotatably mounted in the base memoer 32 are adapted to ride on the raceway 52. Specifically, each of the roller bearings 54 is supported on a bearing pin 56 which extends between the outer wall 58 of the rotatable member 32 and an upstanding annular boss portion 60 formed in the base member 32 and extending upwardly from the bottom wall 62 thereof. The base support 30 is provided with a central sleeve portion 64 which extends upwardly from the floor portion 66 thereof and supports at its upper end a large tapered roller bearing indicated generally at 68 which is positioned between the upper end of the sleeve 64 and an upstanding central sleeve portion 70 formed in the rotatable base member 32. The diameter of the raceway 52 is preferably quite large, preferably in the order of more than 3 feet, and the central large tapered roller bearing 68 preloads the base member 32 and roller bearings 54 so as to make a very rigid mounting for rotation of the base member 32 about its central vertical axis. The central tapered roller bearing 68 also serves to provide the necessary radial constraints for this joint of the industrial robot.

The base support 30 may either be fabricated from steel plates or may be a casting the latter being less expensive when large quantities are involved. In the event the base support 30 is a casting, a minimum amount of machining is required to mount the rotatable base member 32 thereon, this machining involving machining of the sleeve 64 to accept the tapered roller bearing 68 and machining of the annular ring 50 to provide a seat for the raceway 52.

Figures 8, 9, 10:
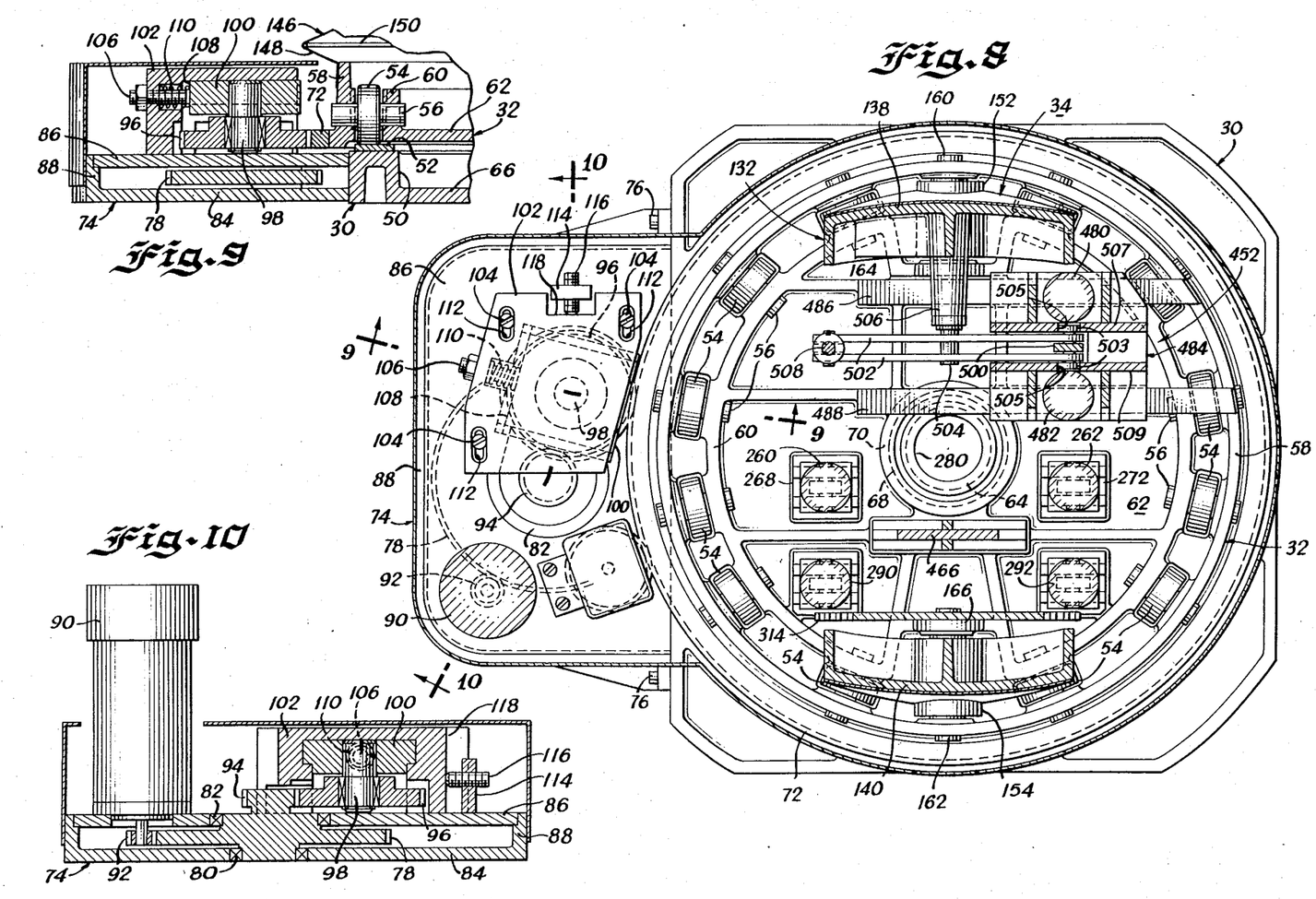
FIG. 8 is a sectional view taken along the line 8—8 of FIG. 7.
FIG. 9 is a sectional view taken along the line 9—9 of FIG. 8.
FIG. 10 is a sectional view taken along the line 10—10 of FIG. 8.

In order to rotate the base member 32 large ring gear 72 is mounted on the periphery of the base member 32 at the bottom edge thereof and an offset base drive unit indicated generally at 74 (FIG. 8) is secured to one wall of the base support 30 by means of the bolts 76. A large spur gear 78 is rotably mounted in the bearings 80 and 82 which are positioned respectively in the base portion 84 of the offset drive unit 74 and a top plate 86 which is mounted in the sidewall 88 of the drive section 74. A base drive motor 90 is mounted on the top plate 86 and a pinion gear 92 which is secured to the output shaft of the motor 90 is in engagement with and drives tne gear 78. A small spur gear 94 which is formed integrally with the gear 78 is in engagement with a spur gear 96 which engages the ring gear 72 and drives the base member 32. The gear 96 is rotatably mounted on a stub shaft 98 which is mounted in a carriage block 100 which in turn is slideably mounted within a housing 102 which is secured to the top plate 86 by means of the bolts 104 (FIG. 8).

The gears 92, 78, 94 and 96 which are used to drive the ring gear 72 are conventional spur gears which should be of at least AGMA10 quality. However, the ring gear 72, due to its large diameter, cannot meet that quality standard for runout when it is mounted on the periphery of the base member 32. In accordance with an important aspect of the present invention, gear stresses in the drive train are eliminated while at the same time providing an anti-backlash arrangement for accurate positioning of the base member by spring loading the gear 96 against the ring gear 72 with a low spring force and providing an outer positive stop for this gear which can be set at the highest point on the ring gear 72. More particularly, an adjustable stop 106 (FIG. 9) is mounted in the housing 102 so that the inner end thereof acts as a positive stop by engagement with the end 108 of the slideably mounted block 100 so as to limit outward travel of the block 100 at a point just beyond the highest point on the ring gear 72. A small coil spring 110 is positioned between the housing 102 and the end face 108 of the slideably mounted block 100 and urges the gear 96 into engagement with the ring gear 72 with a light force which is sufficient to eliminate backlash when a final position is reached and the gear 96 is no longer rotated. However, when a driving force is applied by the motor 90 to the drive train so as to move the base member 32 in either direction the forces produced in the drive train tend to separate the gears 96 and 72 and move the block 100 outwardly against the force of the spring 110 into engagement witn the end of the stop 106 at which point the gears 96 and 72 are properly meshed so as to provide a positive driving arrangement while accommodating runout of the large ring gear 72. In this connection it will be understood that if the anti-backlash spring 110 were made sufficiently strong that it could hold the gear 96 into engagement with the ring gear 72 during the application of power to the drive train and rotation of the base member 32, then substantially larger stresses would be set up in the gears forming this drive train with attendant wear on the gears and special design of the gears to overcome this high loading force. However, with the arrangement of the present invention the relatively light loading force provided by the spring 110 is easily overcome by gears of conventional design so that during driving of the base member 32 in either direction, the end face 108 of the block 100 is held against the ends of the stop 106 so that the gear 96 may drive the ring gear 72 without binding. However, when the motor 90 is deenergized and no gear separating force is developed by the drive train the spring 110 urges the gear 96 into engagement with the ring gear 72 so as to accurately position the base member 32 at the desired location.

As will be discussed in more detail hereinafter, the industrial robot of the present invention is arranged so that it may function with either hydraulically actuated drive elements for the various axes of the robot or, in the alternative, electrical motors and ball screw actuators may be employed to drive the various axes of the robot. Accordingly, the motor 90, which is used to rotate the base 32, may either be an electric motor or a hydraulic motor having a rotary shaft output.

The above described drive train which is used to rotate the base 32 may, in accordance with a further aspect of the invention, be modified to provide different gear ratios which allows the motor which is driving the base 32 to be optimally matched to the load. For example, an appropriate motor may be employed to give a high speed rotation of the base 32 when the robot is called upon to move a relatively light payload in a path relatively close to the vertical axis of the robot. In order to accommodate such change in gear ratio the housing 102 is provided with the slots 112 so that the center of rotation of the gear 96 may be shifted by moving the block 102 relative to the mounting bolts 104. Thus, when a relatively large diameter gear 96 is employed the bolts 104 will be at one end of the slots 112 and when a relatively small diameter gear 96 is employed, so as to provide a higher speed rotation of the base 32, the bolts 104 will be positioned in the opposite end of the slots 112. In order to precisely position the driving gear 96 relative to the pinion gear 94, an upstanding post 114 is secured to the top plate 86 of the base 74 and a threaded adjustment stud 116 is positioned in the post 114 and engages the bottom of a notch 118 in the housing 102. With such an arrangement the gear 96 may be precisely positioned relative to the gear 94 and then bolts 104 tightened to secure the housing 102 in this position.

Figure 4:
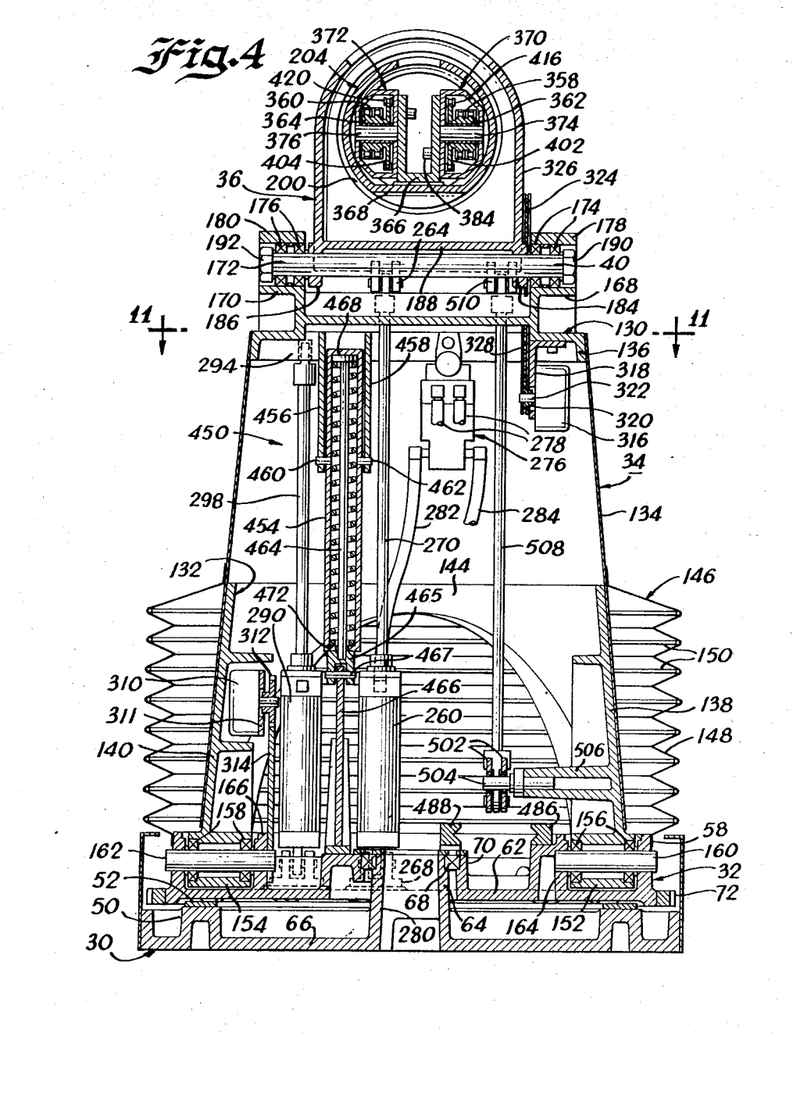
FIG. 4 is a sectional view taken along the lines 4—4 of FIG. 1.

Considering now the construction of the turret or lower arm link 34 and the manner in which the link 34 is pivotally mounted on the rotatable base member 32, it should first be pointed out that in accordance with an important aspect of the present invention the lower arm link 34 is of relatively large diameter, commensurate with the diameter of the rotatable base 32 and is hollow so that it can contain not only the drive elements for moving the lower arm link 34 about its pivotal axis and tilting the boom housing 36 about the axis 40, but also contains counterbalancing elements for both the lower arm link 34 and the boom elements 36 and 38 so that relatively low energy driving sources may be employed to move these portions of the robot. Furthermore, the lower arm link 34 is constructed so that an extremely light link structure is provided which will at the same time have great stiffness and minimum compliance so that the end of the robot arm may be accurately placed at a desired position. More particularly, the lower arm link 34 comprises an upper casting indicated generally at 130 and a lower casting indicated generally at 132, the upper and lower castings 130 and 132 being connected to the opposite ends of a rigid, thin walled tube 134 (FIG. 7) of lightweight high strength composite material such as graphite and glass fibers or boron and glass fibers. The upper casting 130 is provided with a downturned annular flange 136 to which the upper end of the tube 134 is secured. The lower casting 132 includes a pair of opposed downwardly extending V-shaped wall portions 138 and 140 (FIG. 4) to which the bottom portion of the tube 134 is secured. Also, the bottom casting 132 includes the top flanges 142 and 144 (FIG. 7) which interconnect the V-shaped sidewalls 138, 140 to which flanges the tube 134 is also secured. Preferably, the tube 134 is secured to the upper flange 136, the sidewalls 138, 140 and the flange portions 142 and 144 by epoxy bonding so that a stressed skin structure is provided which results in an extremely rigid lower arm link 34. It will be noted that the V-shaped sidewall portions 138, 140 permit the lower arm link 34 to be tilted relative to a horizontal axis to a substantial angle in both directions from the vertical while at the same time providing easy access to the drive components and counterbalancing components positioned within the link 34 for service and maintenance.

Figures 7, 15, 16:
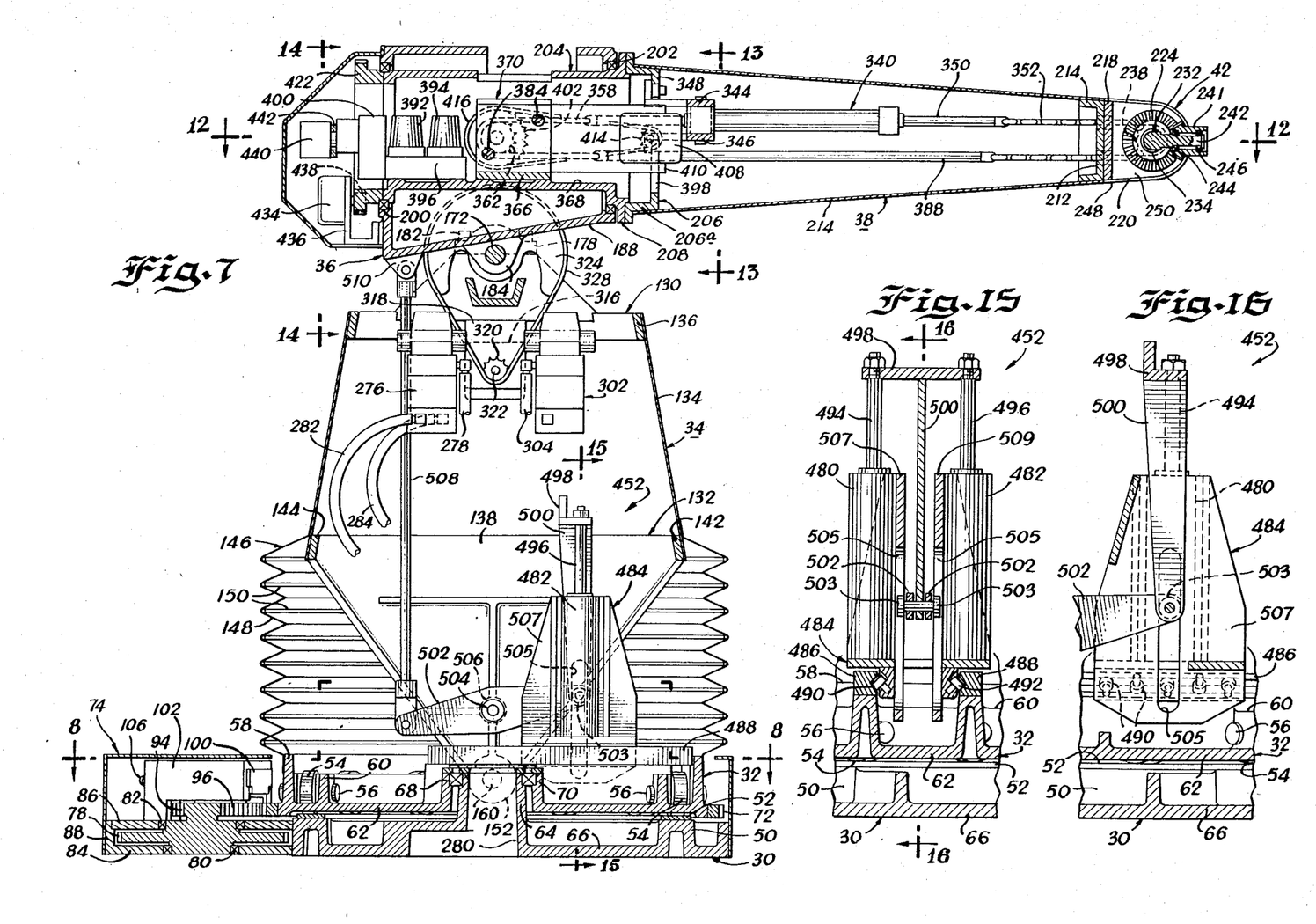
FIG. 7 is a sectional view taken along the line 7—7 of FIG. 2.
FIG. 15 is a sectional view taken along the line 15—15 of FIG. 7.
FIG. 16 is a sectional view taken along the line 15—15 of FIG. 15.

The access openings provided between the link 34 and the base 32 by the V-shaped sidewall portions 138, 140 are normally enclosed by a removable enclosure member indicated generally at 146 (FIG. 7). More specifically, the enclosure member 146 comprises a cover 148 of soft pliable material which is secured at its upper end to the tube 134 by any suitable means such as snap fasteners, or the like and is secured at its lower end to the upstanding wall portion 58 of the base member 32, again by any suitable means such as snap fasteners. In accordance with an important aspect of the invention, the cover 148 is held in a multi-fold bellows configuration by means of a series of wire hoops 150 which are positioned inside the cover 148 and held in the desired bellows configuration. Such a construction permits a combined shearing and folding action for the enclosure 146 as the link 34 is tilted in either direction from the vertical. A similar cover arrangement may be provided between the upper end of the lower link 34 and the housing 36 if desired, as shown in dotted lines in FIG. 1.

In order to pivotally mount the bottom end of the lower arm link 34 on the base member 32 for rotation about a horizontal axis, the V-shaped wall portions 138 and 140 of the lower casting 132 terminate in horizontally directed bearing sleeve portions 152 and 154, (FIG. 4) respectively, in the ends of which are positioned the bearings 156 and 158, respectively, which ride on the bearing pins 160 and 162 which are mounted in the rotatable base member 132. Specifically, the bearing pin 160 is journalled in the outer wall 58 of the base member 32 and an upstanding portion 164 which extends upwardly from the base 62 of the member 32. Similarly, the pin 162 is journalled in the outer wall 58 and an upstanding wall portion 166. It will be noted that with the construction of the present invention the bearing sleeves 152, 154 are spaced a distance of approximately three feet apart so that an extremely rigid joint is provided for moving the link 34 about a horizontal axis. Furthermore, the bearings at each end of the sleeves 152, 154 are spaced a substantial distance apart on the bearing pins 160, 162 thus lending additional rigidity to the pivotal mounting of the link 34 on the base member 32.

In order to pivotally mount the boom housing 36 on the upper end of the lower arm link 34, the upper casting portion 130 thereof is provided with a pair of opposed bearing saddles 168 and 170 within which a transverse bearing pin 172 is supported by the pairs of bearings 174, 176 at either end thereof. The bearing pin 172 is held in the saddles 168, 170 by means of removable bearing caps 178, 180 which are secured by the bolts 182 to the bearing saddles 168, 170. The boom housing 36 is provided with a pair of depending ear portions 184, 186 in the sloping bottom wall portion 188 thereof which are pivotally mounted on the bearing pin 172 for rotation of the housing 36 about the horizontal axis 40. A pair of pin retainer nuts 190 and 192 are positioned on each end of the bearing pin 172 to hold the bearings 174, 176 and the housing 36 in the desired position, appropriate spacers being provided between these elements to maintain their adjusted position.

Figures 1, 2, 3:
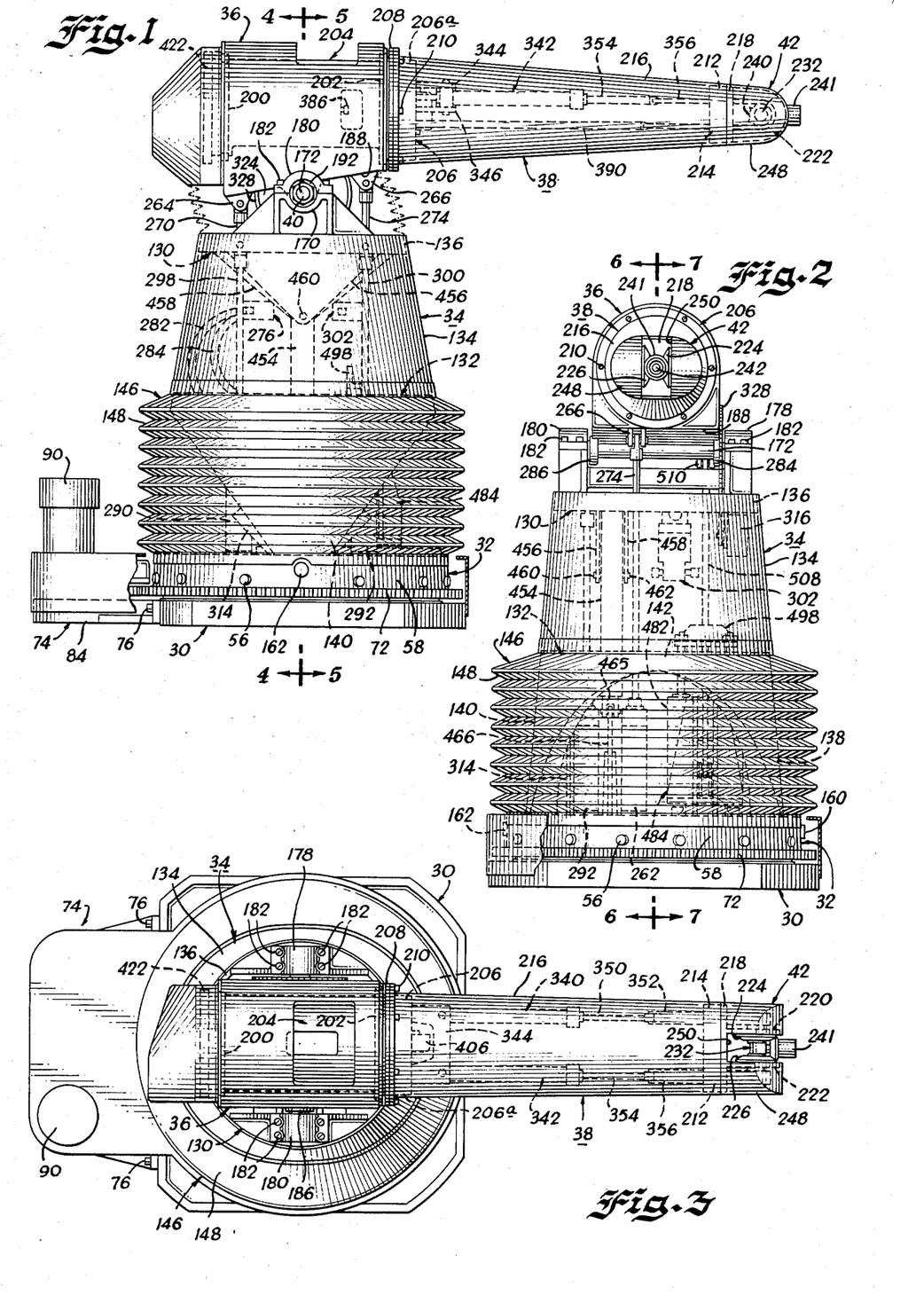
FIG. 1 is a side elevational view of an industrial robot embodying the features of the present invention.
FIG. 2 is a front elevational view of the industrial robot of FIG. 1.
FIG. 3 is a top elevational view of the industrial robot of FIG. 1.

Considering the manner in which the outer boom 38 is rotatably mounted in the boom housing 36 for rotation about the longitudinal axis of the boom 38, the housing 36 is provided with the large diameter bearings 200, 202 (FIG. 6) which rotatably support a hollow tubular casting 204 to which the outer boom 38 is secured. More particularly, a forward cast housing or bulkhead, indicated generally at 206, which has a tapered outer conical surface 206a, is secured to the forward end flange 208 of the tubular casting 204 by means of the bolts 210 (FIG. 1). In order to provide a stressed skin structure for the outer boom 38, in a manner similar to the lower arm link 34 described heretofore, an outer casting 212 is provided which has a tapered conical annular flange 214. A rigid thin walled tube 216 of lightweight high strength composite material similar to the tube 134, is secured at its inner larger end to the conical flange surface 206a and at its outer end to the flange 214 by a suitable arrangement such as epoxy bonding, or the like, so that an extremely rigid, lightweight outer arm link 38 is provided which may support relatively heavy loads without introducing any substantial amount of compliance into the system.

In order to provide a simplified mounting and driving arrangement for moving the manipulator hand 42 in the axes 44 and 46, a plate 218 is secured to the outer casting 212 and has a pair of forwardly extending spaced apart parallel wall portions 220 and 222 within which a pair of beveled gears 224 and 226 are journalled in the bearings 228 and 230, respectively. A T-shaped member 232 is journalled in the bearings 234 and 236 mounted in the end faces of the bevelled gears 224 and 226, respectively, so that the T-shaped member 232 may be rotated about the axis 44 at the end of the outer arm link 34. A pair of sprockets 238 and 240 are rotatably mounted on the opposed ends of the T-shaped member 232 and are secured to the sleeves of the beveled gears 224 and 226, respectively. The manipulator hand 42 includes a third bevelled gear 241 which is rotatably mounted on the offset portion 242 of the T-shaped member 232 by means of the spaced apart bearings 244 and 246, the bevelled gear 241 being in mesh with both of the bevelled gears 224 and 226. It should be noted that the drive train for the manipulator hand 42 i.e., the bevelled gears 224, 226 and 241 comprise a very simple drive arrangement for moving the hand 42 in both of the axes 44 and 46 while providing a supporting arrangement which is inherently very strong and rigid since all three bevelled gears are sharing the load. Furthermore, the central bevelled gear 241 on the end of the manipulator hand 42 is loaded symmetrically so as to reduce deflection and edge loading of the gear teeth. Also, the forces from the chains connected to the sprockets 238, 240 and the pay load carried by the manipulator hand 42 are carried directly from the gears in the hand gear chain to the bearings in the arm structure with no intermediate housing or structure being in the load path.

A cover 248 is employed to protect the gearing in the hand gear train from contamination, this cover being secured to the edge of the plate 218 and to the outer edges of the walls 220 and 222 so as to provide a slot 250 to accommodate movement of the manipulator hand about the axis 44. When it is desired to move the hand 42 about the axis 44 both of the bevelled gears 224 and 226 are rotated in the same direction and at the same speed so that the central bevelled gear on the end of the hand 42 is carried bodily about the axis 44. When it is desired to rotate the hand 42 about its swivel axis 46 without producing movement relative to the axis 44, the bevelled gears 224 and 226 are rotated in opposite directions at the same speed. When one of the bevelled gears 224, 226 is held stationary and the other gear is rotated, simultaneous movement of the manipulator hand in both of the axes 44 and 46 is produced since the T-shaped member 232 is free to rotate in the bearings 234, 236 when thrust is exerted on the fixed one of the bevelled gears 224, 226 through the meshing bevel gear 241. In this connection it should be noted that due to the simplicity of the hand gear train of the present invention this gear train may be much lighter than conventional gear trains involving a large number of gears while at the same time providing a very strong hand driving arrangement which is capable of carrying heavy loads. When hydraulic drives are employed to drive the sprockets 238 and 240, as will be described in more detail hereinafter, the industrial robot of the present invention is capable of carrying a load of 5,000 to 6,000 inch pounds.

The lower arm link 34 and the outer arm link 38 are moved about their respective pivotal axes by means of a pair of hydraulic cylinders which are positioned on opposite sides of the pivot axis and are pressurized only on the rod side of the piston so that the piston rods are always are in tension. Such an arrangement has the advantage that the piston rods of each pair may be of substantially smaller diameter than in the case of a double acting hydraulic actuator which is called upon to exert power in both directions and wherein the piston rod must be of substantially larger diameter to resist bending when exerting a compression load on the movable element. The use of a pair of hydraulic cylinders in which the piston rods are always in tension and are of small diameter has the additional advantage that there is less friction when small diameter piston rods are used so that energy can be conserved in moving the robot to a desired position. Furthermore, by employing a pair of hydraulic cylinders in which the piston rods are in tension the pressurized side of the cylinders may be connected together through a by-pass valve during slewing motion of the robot to provide energy conservation for large movements of the robot, as described in detail in my copending application Ser. No. 369,278, U.S. Pat. No. 4,581,893, filed Apr. 19, 1982, and as will be described in more detail hereinafter.

Considering first the arrangement provided in accordance with the present invention for moving the outer arm link 38 about the bearing rod 172, a pair of single acting hydraulic cylinders 260 and 262 (FIG. 6) are connected between the base 62 of the rotatable base member 32 and pairs of depending ear portions 264 and 266 formed in the sloping bottom wall 188 of the boom housing 36 on opposite sides of the bearing pin 172. More particularly, the cylinder portion of the single acting cylinder 260 is pivotally connected to a block 268 secured to the base 62 and the piston rod 270 thereof is pivotally connected to the pair of ear portions 264. In a similar the cylinder portion of the single acting actuator 262 is pivotally connected to the block 272 and the piston rod 274 thereof is pivotally connected to the pair of ears 266.

Considering now the manner in which the two single acting cylinders 260 and 262 may be controlled in accordance with the present invention to produce movement of the outer arm link 38 about the bearing pin 172, a servo valve indicated generally at 276 is mounted on the upper casting 130 of the lower arm link 34 and hydraulic pressure and return lines 278 are connected to a servo valve 276, these lines being brought into the interior of the lower arm link 34 through the large central opening 280 provided in the support member 30. Output control lines 282 and 284 are supplied respectively to the rod side of the cylinders 260 and 262. Accordingly, when the outer end of the outer link 38 is to be raised the servo valve 276 is controlled by suitable electrical signals so as to supply pressure to the line 282 connected to the cylinder 260 so that its piston rod will pull the back end of the housing 36 downwardly while at the same time the line 284 to the cylinder 262 is connected to the hydraulic reservoir of the system so as to permit the piston rod 274 to move upwardly within the cylinder 262. In a similar manner when it is desired to lower the end of the outer link 38, the servo valve 276 is controlled so as to supply pressurized fluid over the line 284 to the rod side of the cylinder 262 so that the piston rod 274 pulls the front end of the housing 36 downwardly while at the same time the line 282 is vented to the reservoir so as to permit the piston rod 270 to move upwardly within the cylinder 260. It will thus be seen that the outer arm link 38 is moved about the bearing pin 172 by a hydraulic cylinder arrangement wherein the piston rod causing movement of the link 38 in a particular direction is always under tension and hence may be of relatively small diameter. It should be noted that since the piston rods 270 and 274 are of the same diameter the effective area on the upper side of the pistons in the cylinders 260 and 262 is equal and hence the supply lines 282 and 284 may be connected together by a suitable bypass valve arrangement during a slewing motion of the outer boom 38 so as to provide energy conservation in the manner described in detail in my copending application Ser. No. 369,278. As described in that application, a bypass valve which interconnects the supply lines 282 and 284 is opened during a slewing motion of relatively large extent so that oil can circulate between the cylinders 260 and 262 directly while the servo valve 276 is closed. When the desired position is approached the bypass valve is closed and the resultant pressure rise in one of the cylinders forces oil into the hydraulic accumulator of the system through a check valve when this pressure exceeds the system pressure as the arm is decelerated to the desired final position. Such bypass valve and check valves may be mounted as a part of the servo valve 276 in the arrangement of the present invention to provide energy conservation for large movements of the outer boom 38.

Considering now the manner in which the lower arm link 34 is driven in accordance with the present invention, a pair of single acting hydraulic cylinders 290 and 292 are connected between the base portion 62 of the rotatable base member 32 and the upper casting portion 130 of the lower link 34. More specifically, the peripheral portion of the casting 130 is provided with the pockets 294 and 296 to which the piston rods 298 and 300 of the cylinders 290 and 292 are pivotally connected. The cylinders 290 and 292 are controlled in accordance with the present invention by means of a servo valve indicated generally at 302 which is mounted on the upper casting portion 130 of the lower link 34. Hydraulic pressure and return lines 304 are supplied to the servo valve 302, these lines being brought into the interior of the lower arm link 34 through the central opening 280 in the support member 30. The output control lines of the servo valve 302 (not shown) are supplied to the rod side of the cylinders 290 and 292. Accordingly, when the lower link 34 is to be tilted forwardly about the bearings 160, 162 the servo valve 302 is controlled by suitable electrical signals so as to supply pressure to the rod side of the cylinder 292 so that its piston rod will pull the link 34 forwardly and downwardly while at the same time the line to the other cylinder 290 is connected to the hydraulic reservoir of the system so as to permit the piston rod 298 to move upwardly within the cylinder 290. In a similar manner when it is desired to tilt the link 34 rearwardly the servo valve 302 is controlled so as to supply pressurized fluid to the rod side of the cylinder 290 so that the piston rod 298 pulls the back end of the link 34 rearwardly and downwardly while at the same time the return line to the cylinder 292 is vented to the reservoir so as to permit the piston rod 300 to move upwardly within the cylinder 292. As discussed in connection with the cylinders 260, 262, since the piston rods 298 and 300 are of the same diameter the effective area on the upper side of the pistons in the cylinders 290 and 292 is equal and hence the supply lines to these cylinders may be connected together by a suitable bypass valve arrangement during an extended motion of the link 34 about the bearings 160, 162 so as to provide energy conservation in the manner described in detail in my copending application Ser. No. 369,278. This bypass valve and its associated check valves may conveniently be mounted as part of the servo valve 302 in the arrangement in the present invention.

While the upper arm link 38 and lower arm link 34 have been illustrated and described as being driven by hydraulic actuators, it will be appreciated that these links may also be driven by electric motors (preferably permanent magnet D.C. motors) and ball screw actuators, there being ample room within the link 34 for such drive elements.

Considering now the manner in which movement of the outer arm link 38 and the lower link 34 around their respective axes is measured, in accordance with an important aspect of the present invention a simple, accurate and reliable arrangement is provided for such measurement by employing large sector gears so that the back lash involved in multiple gear trains is eliminated. More particularly, considering the manner in which movement of the lower link 34 about the bearing pins 160 and 162 is measured, a rotary encoder 310, which may comprise any suitable digitizing type of encoder such as the photoelectric encoder shown in Leonard Pat. No. 3,525,094, is secured to a bracket 311 which is mounted on the V-shaped sidewall portion 140 of the lower casting 132 directly above the bearing pin 162. A spur gear 312 is connected to the output shaft of the encoder 310 and is in mesh with a large sector gear 314 which is centered about the bearing pin 162 and is secured to the annular upstanding flange portion 166 of the base 62 so that the sector gear 314 does not move when the link 34 is tilted about its horizontal axis. Instead, the spur gear 312 rolls around the periphery of the sector gear 314 as the link 34 is tilted about this axis.

Movement of the outer link 38 about the bearing rod 172 is measured by a similar arrangement which comprises the rotary encoder 316 (FIG. 4), which may be similar to the encoder 310, and is mounted on a bracket 318 secured to the upper casting 130 of the lower link 34. A sprocket 320 is connected to the output shaft 322 of the encoder 318 and is interconnected with a large sprocket 324 through the chain 328. The sector gear 324 is mounted on the sidewall 326 of the housing portion 36 so that it moves with this housing as the outer arm link 38 is tilted about the bearing rod 172.

Considering now the driving means provided for moving the manipulator hand 42 in the axes 44 and 46, a first double acting hydraulic cylinder indicated generally at 340 (FIG. 7) is provided for driving the sprocket 238 and a similar double acting cylinder 342 is provided for driving the sprocket 240. Both of the double acting cylinders 340 and 342 are positioned within the outer arm link 38 and are mounted therein by supporting one end of the actuator between the brackets 344 and 346 which are secured to the front wall 348 of the forward housing 206. The double acting piston 350 of the cylinder 340 is connected at its outer end to a drive chain section 352 which extends around the sprocket 238 and the double acting piston rod 354 of the cylinder 342 is connected at its forward end to a chain drive section 356 which extends around the sprocket 240. The rearward ends of the piston rods 350 and 354 are connected to the drive chain portions 358 and 360, respectively which extend around idler sprockets 362 and 364 which are rotatably mounted within the tubular casting 204 which is itself rotatably mounted within the boom housing 36. More particularly, a U-shaped bracket 366 is mounted on the flat bottom wall portion 368 (FIG. 4) of the tubular casting 204. A pair of housings 370 and 372 are slideably mounted on the sidewalls of the bracket 366, the housing 370 carrying a stud shaft 374 (FIG. 4) on which the sprocket 362 is rotatably mounted and the housing 372 carrying a stud shaft 376 on which is rotatably mounted the sprocket 364. The housings 370 and 372 are adjustably positioned relative to the tubular casing 204 so that the respective chain portions associated with each of the actuators 340, 342 may be tightened to eliminated backlash in the respective driving systems. Thus, the housing 370 may be adjusted relative to the casing 204 by adjusting the bolt 378 which is rotatably mounted in the inwardly extending flange portion 380 of the tubular casing 204 and engages the wall 382 of the housing 370 so that all backlash is removed from the chain driving sections 352 and 358. After the housing 370 has thus been adjusted it is secured in position by means of the bolts 384 which extend through the sidewall of the bracket 366. In a similar manner the housing 372 may be adjusted by means of the adjustment bolt 386 so as to remove backlash from the chain driving sections 356 and 360 after which the housing 372 is locked in position on the bracket 366.

While the backlash may thus be removed from the drive chain sections associated with each of the actuators 340 and 342, there is nevertheless a certain amount of compliance inherent in such a chain drive system. In accordance with a further aspect of the invention, the chain drive sections 352, 356, 358 and 360 are made to have only a minimum length sufficient to move the manipulator hand 42 through the desired range of motion, the remaining portions of the conventional drive chain being eliminated and a solid rod is substituted therefore. Thus, the steel rod 388 is connected to the bottom portions of the chain drive sections 352 and 358 and the steel rod 390 is connected between the bottom ends of the chain drive portions 356 and 360 associated with the actuator 342.

In order to control the hydraulic dual acting cylinders 340 and 342, the servo valves 392 and 394 are mounted on the manifold 396 which is in turn mounted on the tubular casing 204 which is rotatably mounted within the boom housing 36. Each of the servo valves 392, 394 is connected to the opposite ends of one of the cylinders 340 or 342 through suitable hoses (not shown) which extend from the servo valve 392, 394 through the opening 398 in the forward housing 206 and are connected to each end of the cylinders 340 and 342 so as to move the respective piston rods 350 and 354 in both directions in accordance with electrical signals supplied to the servo valves 392, 394. The hydraulic supply and return lines for the servo valves 392, 394 are supplied through a dual swivel fitting 400 so that the outer arm link 38 may be rotated while the hydraulic supply and return lines remain stationary, these supply and return lines extending from the swivel 400 downwardly inside the lower arm link 34 and through the large central opening 80 in the base member 30.

In order to measure movement of the actuators 340 and 342, a pair of drive sprockets 402 and 404, which are preferrably integral with the chain idler sprockets 362 and 364, respectively, are employed to drive the rotary encoders 406 and 408 which are mounted on forwardly extending flange portions 410 and 412 of the housing 370 and 372, respectively. The drive sprocket 402 is connected to a sprocket 414 through the chain 416 and the drive sprocket 404 is connected to a sprocket 418 on the shaft of the encoder 408 through the chain 420. The rotary encoders 406 and 408 are preferably adjusted mounted on the flanges 410 and 412 so that backlash in the encoder drive chains 416 and 420 can be removed. However, it will be noted that the main drive housing 370 and 372 may be adjusted to remove backlash in the dual actuators 340 and 342 without affecting the drive of the encoders 406 and 408 since the encoders and their drive elements are all mounted on the housings 370, 372.

In order to rotate the outer arm link 38 about its longitudinal axis so as to provide a so called swivel axis movement of the manipulator hand 42, a large ring gear 422 is secured to the rear end of the tubular casting 204 and projects rearwardly beyond the bearings 200. A rotary hydraulic or electric drive motor 424 is mounted on bracket 426 which is supported from the rear end of the boom housing 36, the motor 424 being interconnected with the ring gear 422 through the gears 428, 430 and 432, the gear 428 being connected to the shaft of the motor 424. A rotary encoder 434, which is mounted on a bracket 436 secured to the boom housing 36 is interconnected with the ring gear 422 through the spur gear 438 so that the encoder 434 measures rotation of the outer arm link 438 in the swivel axis, it being noted that the interconnection of the encoder 434 with the rotary tubular casting 204 is through the single gear set 422, 438. A servo valve 440 is employed to control the drive motor 424, this servo valve being mounted on the bracket extension 442 of the bracket 426 which also supports the non rotary portion of the swivel fitting 400 for the servo valves 392 and 394. The servo valve 440 is interconnected with the driving motor 424 by means of suitable supply and return lines (not shown) so as to control movement of the outer arm link 38 in the swivel axis.

While the outer arm link 38 and hand 42 have been illustrated and described as being driven by hydraulic motors or actuators, it should be understood that these elements can also be driven by suitable permanent magent D.C. electric motors mounted in the boom housing 204. Preferably samorium-cobalt magnet motors ares employed because of their light weight. Also, the motors driving the hand 42 may employ a spiroid gear set to obtain an approximately 25:1 gear reduction using one pass gearing.

In accordance with a further important aspect of the invention, the lower arm link 34 and the outer arm link 38 are both counterbalanced so that each of these links may be pivotted about its respective pivotal axis by relatively low energy driving means. This counterbalancing arrangement permits the use of relatively small hydraulic cylinders 260, 262 and 290, 292 for moving the links 38 and 34 about their respective axes. Also, this counterbalancing arrangement enables the use of a low pressure, low flow hydraulic power source during the teaching operation so that the industrial robot is safe during the programming mode, as described in detail in my copending application Ser. No. 324,697 Pat. No. 4,442,387, filed Nov. 25, 1981. More particularly, a compression spring counterbalancing system indicated generally at 450 is provided to counterbalance the lower arm link 34 and the weight of the outer arm link 38 which is concentrated around the pivotal axis 172 of the link 38. In addition, a pneumatic counterbalancing arrangement indicated generally at 452 is provided to counterbalance the pay load on the outer end of the link 38 as well as the remaining unbalanced weight of the link 38.

Figures 6, 11:
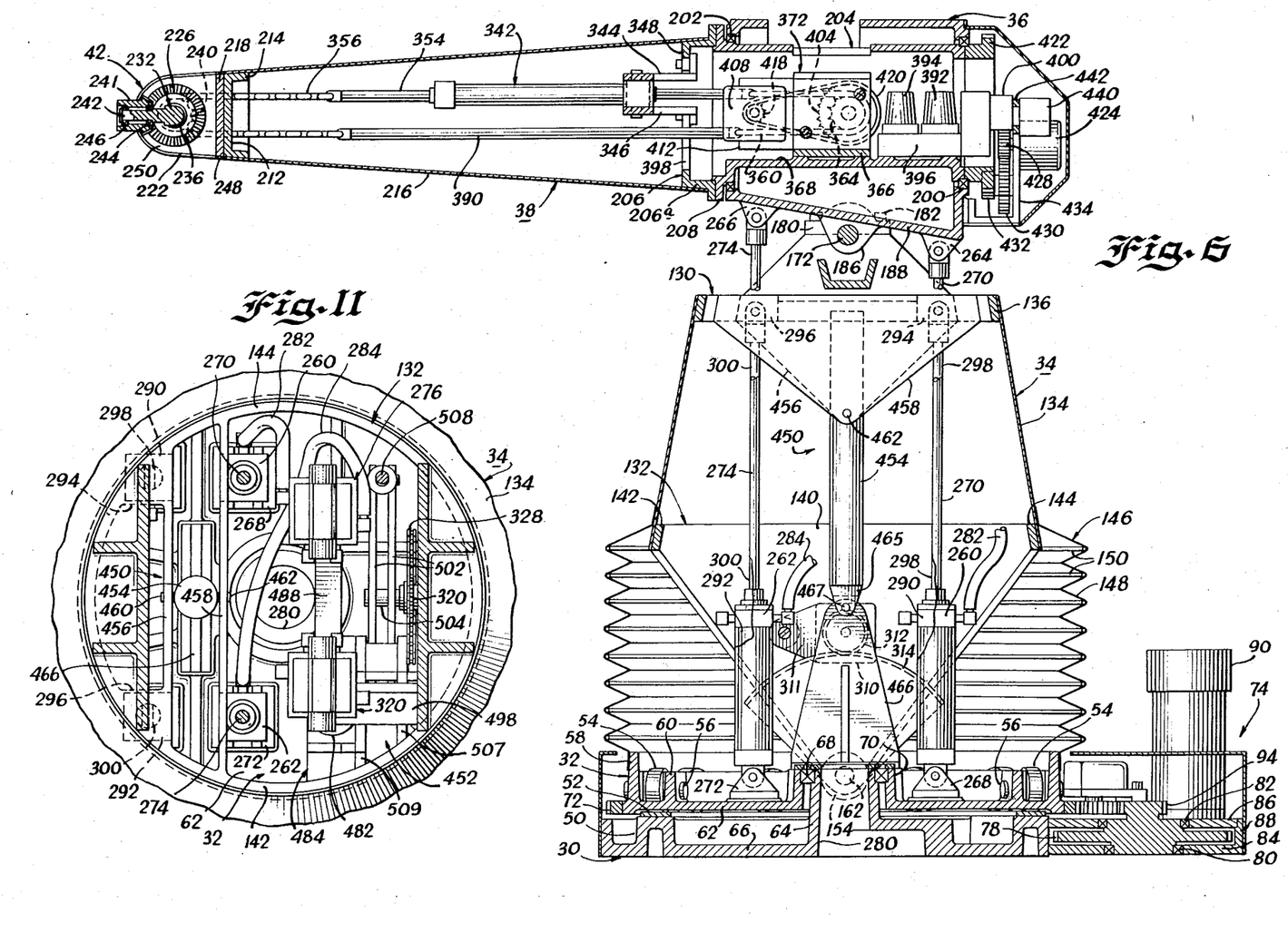
FIG. 6 is a sectional view taken along the line 6—6 of FIG. 2.
FIG. 11 is a sectional view taken along the line 11—11 of FIG. 4.

Considering first the compression spring counterbalancing arrangement 450 (FIG. 6), this arrangement comprises an outer sleeve 454 which is positioned between a pair of vertically extending plates 456 and 458 (FIG. 4) which are mounted on the upper casting 130 of the link 34 and extend downwardly therefrom, the sleeve 454 being pivotally connected to the lower ends of the plates 456, 458 by means of the pins 460 and 462 at a point intermediate the length of the sleeve 454. A central rod 464 is mounted in a pivot block 465 which is pivotally mounted on the pin 467 in the upper end of a plate 466 which is secured to the rotatable base member 32. The rod 464 is positioned within the sleeve 454 and is provided with an upper head portion 468. A compression spring 470 is positioned in the sleeve 454 between the head portion 468 and the end flange 472 provided at the bottom end of the sleeve 454. The compression spring 470 thus exerts a force between the head portion 468 of the rod 464 and the end flange 472 of the sleever 454 tending to force these members apart. When the lower link 34 is in its mid position shown in FIG. 6 the compression spring counterbalancing assembly 450 is positioned vertically, as shown in FIG. 6. However, when the lower link 34 is pivotted about the horizontal axis of the bearing pins 160, 162 the distance between the pivot pins 462 and 467 increases so that the spring 464 is compressed and produces a downward force on the upper end of the link 34 which has a component which is directed inwardly toward the vertical axis and is proportional to the displacement of the link 34 from its mid position shown in FIG. 6. The compression spring assembly 450 thus provides a counterbalancing force for the lower link 34 which is proportional to the displacement of this link from its vertical mid position so that the link may be pivoted throughout its entire range of travel by the relatively low power hydraulic cylinders 290 and 292.

Figure 5:
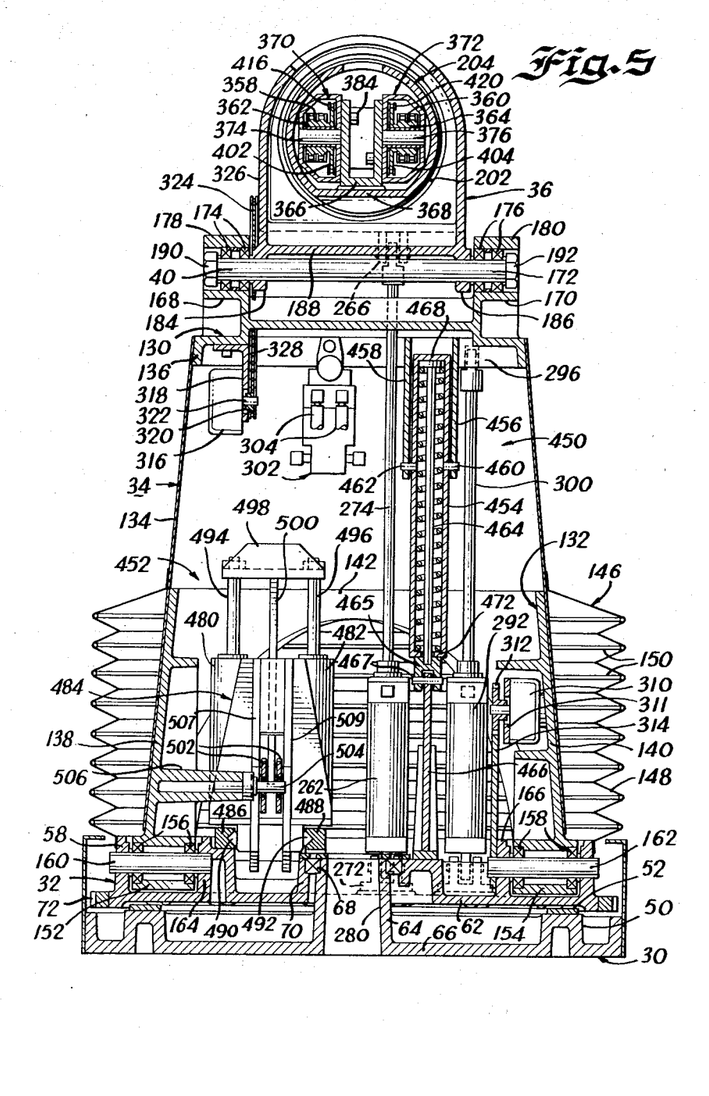
FIG. 5 is sectional view taken along the line 5—5 of FIG. 1.

Considering now the pneumatic counterbalancing assembly 452, this assembly is employed to counterbalance the weight of the outer portion of the outer arm link 38 and any pay load which may be connected to the manipulator hand 42. However, since the lower link 34 is pivoted about a horizontal axis and the outer arm link 38 is carried on the upper end of the link 34, the moment exerted by a particular pay load will vary as the lower link 34 is pivoted about its horizontal axis. In accordance with an important aspect of the present invention a pneumatic balancing arrangement is provided on a movable carriage which accommodates movement of the lower arm link 34 while maintaining a constant counterbalancing force for the weight of the outer end of the arm 38 and any payload carried thereby. More particularly, a pair of pneumatic single acting cylinders 480 and 482 (FIG. 5) are mounted on a carriage indicated generally at 484 which is arranged to move along the ways 486 and 488 which are mounted on the rotatable base member 32 such movement being provided by the roller bearings 490 and 492. The piston rods 494 and 496 (FIG. 4) of the cylinders 480, 482 are connected together at their upper ends by means of the bracket 498 and a vertically extending plate 500 is connected at its upper end to the bracket 498 intermediate the piston rods 494 and 496, this plate or lever being pivotally connected at its lower end to a pair of levers 502 (FIG. 7) which are pivotally mounted on the pin 504 mounted on the end of an inwardly projecting post 506 formed in the sidewall 138 of the lower casting 132. The other ends of the levers 502 are pivotally connected to the lower end of the rod 508 the upper end of which is pivotally connected to a lug portion 510, extending downwardly from the boom housing 36 behind the bearing rod 172. When air under pressure is introduced into the bottom ends of the cylinders 480 and 482 the piston rods 494 and 496 move upwardly carrying the lever 500 upwardly which pivots the levers 502 in a counterclockwise direction, as viewed in FIG. 7, so that the rod 508 is moved downwardly and counterbalances the weight of the outer portion of the arm link 38 and any pay load connected to the manipulator hand 42. A roller 503 is provided on the right hand end of each of the levers 502, this roller moving within a slot 505 provided in each of the walls 507 and 509 of the carriage 484.

As the lower link 34 is tilted forwardly the carriage 484 moves outwardly along the ways 486, 488 because such tilting motion of the lower link 34 moves the levers 502 bodily to the right, as viewed in FIG. 7 and the rollers 503 are interconnected with the walls 507 and 509 of the carriage 484. Also, during such forward tilting motion of the link 34 the righthand ends of the levers 502 will move downwardly relative to the base member 32 so as to move the piston rods 494 and 496 downwardly within the cylinders 480, 482, thereby exerting a greater counterbalancing force on the back end of the boom housing 36.

Air under pressure is supplied to the bottom ends of the pneumatic cylinders 480 and 482 from any suitable pressurized source through cables (not shown) which are led through the large central opening 280 in the base member 30. Preferably, this pressurized source is controllable so that the air pressure supplied to the cylinders 480, 482 may be adjusted to compensate for various pay loads connected to the outer end of the link 38. For example, when a fixed load such as a weld gun is connected to the manipulator hand 42, the appropriate air pressure will be supplied to the cylinders 480, 482 to compensate for the additional load of the weld gun on the outer end of the link 38.

While there has been described what is at present considered to be the preferred embodiment of the invention, it will be understood that various modifications may be made therein which are within the true spirit and scope of the invention.

What is claimed as new and desired to be secured by Letters Patent of the United States is:

1. In a manipulator apparatus, the combination of, a turret mounted for pivotal movement about a first horizontal axis, a boom support mounted in the upper end of said turret for pivotal movement about a second horizontal axis, a boom mounted in said boom support for rotation about an axis perpendicular to and offset from said second horizontal axis, a first bevel gear mounted on the end of said boom for rotation about a first axis in the same plane as said rotational axis of said boom, a pair of bevel gears in mesh with said first bevel gear on opposite sides of said rotational axis and mounted for rotation about a second axis intersecting with and perpendicular to said rotational axis, driving means carried by and rotating with said rotatably mounted boom for independently rotating said pair of bevel gears, said driving means including a pair of hydraulic cylinders mounted within said boom, means interconnecting the piston of each of said cylinders to one of said pair of bevel gears, a first pair of sprockets mounted for rotation about said second axis and individually connected to said pair of bevel gears, a second pair of sprockets rotatably mounted within said boom, and a pair of chains individually in mesh with one sprocket of each of said first and second sprockets and interconnected with the piston of one of said cylinders, the piston rod of each of said cylinders being connected at either end thereof to one of said chains, and a solid rod of the same length as said piston rod connected to each of said chains and adapted to move in the opposite direction from said piston rod, thereby to minimize the length of chain employed to rotate each of said pairs of bevel gears.

2. In a manipulator apparatus, the combination of, a turret mounted for pivotal movement about a first horizontal axis, a boom support mounted in the upper end of said turret for pivotal movement about a second horizontal axis, a boom mounted in said boom support for rotation about an axis perpendicular to and offset from said second horizontal axis, a pair of bevel gears mounted coaxially on the end of said boom for rotation about a first axis perpendicular to said rotational axis of said boom, a member having opposed projecting portions which are mounted in said pair of bevel gears for rotation about said first axis, said member having another projecting portion extending away from said first axis, a third bevel geat rotatably mounted on said other projecting portion and in mesh with both of said pair of bevel gears, driving means mounted within said boom for independently rotating said pair of bevel gears, a work member connected to and movable with said third bevel gear, said driving means including a pair of sprockets connected to and rotatable with said pair of bevel gears, a chain in mesh with each of said sprockets, separate sources of driving power positioned within said boom and connected to said chains, said sources of driving power each comprising a drive sprocket in mesh with one of said chains, and an hydraulic cylinder positioned between said drive sprocket and one of said pair of sprockets and including a piston rod extending from either end thereof, means connecting the ends of said piston rod to said chain, and a solid rod of the same length as said piston rod and connected to said chain on the side opposite said hydraulic cylinder.

* * * * *